United States Patent [19]

Cochrane

[11] Patent Number: 5,116,535

[45] Date of Patent: May 26, 1992

[54] AQUEOUS COLLOIDAL DISPERSION OF FUMED SILICA WITHOUT A STABILIZER

[75] Inventor: Hector Cochrane, Champaign, Ill.

[73] Assignee: Cabot Corporation, Boston, Mass.

[21] Appl. No.: 326,891

[22] Filed: Mar. 21, 1989

[51] Int. Cl.⁵ .............................................. B01J 13/00
[52] U.S. Cl. .................................. 252/313.2; 252/314
[58] Field of Search ...................... 252/310, 313.2, 314; 106/287.34; 65/901; 423/336

[56] References Cited

U.S. PATENT DOCUMENTS

| | | | |
|---|---|---|---|
| 4,042,361 | 8/1977 | Bihuniak et al. | 65/21.5 X |
| 4,200,445 | 4/1980 | Bihuniak et al. | 65/21.5 X |
| 4,321,243 | 3/1982 | Cornwell et al. | 252/313.2 X |
| 4,613,454 | 9/1986 | Keiser | 252/313.2 |

FOREIGN PATENT DOCUMENTS 60-129132  7/1985  Japan ............................. 252/313.2
1326574   8/1973  United Kingdom .

OTHER PUBLICATIONS

Kirk–Othmer, Encyclopedia of Chemical Technology, 3rd Ed., vol. 20 (John Wiley & Sons, NY) p. 766–781.
Iler, Ralph K., The Chemistry of Silica, (John Wiley & Sons, New York, 1979) pp. 336–338.

Primary Examiner—Robert L. Stoll
Assistant Examiner—Daniel S. Metzmaier
Attorney, Agent, or Firm—David J. Koris

[57] ABSTRACT

A stable non-dilatant aqueous colloidal dispersion of fumed silica, without a stabilizer, having a fumed silica concentration of at least about 35% by weight. Also disclosed is a process for producing aqueous colloidal dispersions of fumed silica, without a stabilizer, which are stable and non-dilatant.

19 Claims, No Drawings

AQUEOUS COLLOIDAL DISPERSION OF FUMED SILICA WITHOUT A STABILIZER

FIELD OF THE INVENTION

The present invention relates to an aqueous colloidal dispersion of fumed silica, without a stabilizer, and a process for producing a aqueous colloidal dispersion of fumed silica.

BACKGROUND OF THE INVENTION

There are many applications for fumed silicas of extremely fine particle size in which it is convenient to apply the fumed silica in the form of an aqueous colloidal dispersion. Such applications include paper coatings, the sol-gel process for the manufacture of optical fibers and quartz glassware, and thermal insulation. Aqueous colloidal dispersions of fumed silica are also utilized for frictionizing and polishing. There are also many occasions where it is convenient to densify fumed silica for storage or transport by combining the fumed silica with water to form an aqueous colloidal dispersion.

Fumed silica is generally produced by the vapor phase hydrolysis of chlorosilanes, such as silicon tetrachloride, in a hydrogen oxygen flame. The overall reaction is:

$$SiCl_4 + 2H_2 + O_2 \rightarrow SiO_2 + 4HCl$$

In this process, submicron sized molten spheres of fumed silica are formed. These particles collide and fuse to form three dimensional branched, chain-like aggregates, of approximately 0.1 to 0.5 micron in length. Cooling takes place very quickly, limiting the particle growth and insuring the fumed silica is amorphous. These aggregates in turn form agglomerates ranging in size from 0.5 to 44 microns (325 US mesh). Fumed silicas generally have very high purity, with total impurities, in many cases below 100 ppm (parts per million). This high purity makes fumed silica aqueous dispersions particularly advantageous for many applications.

Another consideration for many applications is the removal of grit from the aqueous colloidal dispersion of fumed silica since grit is a major source of impurities. Grit can also interfere with many applications of the dispersion. For example, in coagulation of latex rubber, grit will lead to the formation of defects in the structure of the rubber, and in the polishing of semiconductor single crystals grit can cause scratching. Thus it is generally desirable that the aqueous dispersion be of high purity. One method for increasing purity is to pass the aqueous colloidal dispersion of fumed silica through a filter, also referred to as filtering, to remove grit and other impurities. In order for an aqueous colloidal dispersion of fumed silica to be filterable, the viscosity of the colloidal dispersion must be low enough, and the colloidal dispersion must be non-dilatant, to enable the colloidal dispersion to pass through the desired filter. For the purposes of the present invention, a non-dilatant dispersion is a dispersion which will pass through a filter having a pore size of 1000 microns or smaller.

As described above, the ability of a dispersion to pass through a filter is also related to the viscosity of a dispersion. The finer the filter, i.e. the smaller the size of the pores of the filter, the lower the viscosity of the aqueous colloidal dispersion of fumed silica must be to pass through the filter. As will be appreciated by those of ordinary skill in the art, to increase purity, the aqueous colloidal dispersion of fumed silica should be passed through as fine a filter as possible. Thus it is generally advantageous to produce aqueous colloidal dispersions of fumed silica with low viscosities. For the purposes of the present invention low viscosities are viscosities below about 1000 centipoise.

Additionally, in order to be useful for the applications listed above and other potential applications the aqueous colloidal dispersion of fumed silica cannot gel into a solid. The ability of the aqueous colloidal dispersion of fumed silica to resist gelling is generally referred to as the stability of the aqueous colloidal dispersion. More stable aqueous colloidal dispersions will not gel as soon as less stable aqueous colloidal dispersions.

Generally a stabilizer, such as an alkali or base, is added to an aqueous colloidal dispersion of fumed silica to increase the stability of the colloidal dispersion. Thus, most generally known stable aqueous colloidal dispersions of fumed silica are actually aqueous colloidal dispersions of fumed silica and stabilizer. These aqueous colloidal dispersions of fumed silica are known to contain amounts of fumed silica of 30%, 40% and even up to 70%, by weight. For example, U.S. Pat. No. 2,984,629, to Loftman et al., hereinafter "Loftman", discloses an aqueous colloidal dispersion of fumed silica and alkali having a fumed silica concentration up to about 40% by weight. G.B. Patent No. 1,326,574, to Diether, hereinafter "Diether", discloses an aqueous colloidal dispersion of fumed silica and stabilizer having a fumed silica concentration up to about 70% by weight. The stabilizer in Diether is also an alkali.

However, in generally known aqueous colloidal dispersions of fumed silica, not containing an alkali or stabilizer, fumed silica concentrations of greater than about 30% by weight, result in an unstable colloidal dispersion which quickly gels. Also, in these generally known aqueous colloidal dispersions, as the fumed silica concentration of the aqueous colloidal dispersion nears 30%, by weight, the viscosity, and dilatancy of the aqueous colloidal dispersion increase to the point that passing the aqueous colloidal dispersion through a filter to remove impurities becomes very difficult.

For certain applications, however, it is desirable to have an aqueous colloidal dispersion of fumed silica without the presence of alkali and/or stabilizer where the concentration of fumed silica is greater than about 35% by weight. However, in heretofore generally known processes for producing aqueous colloidal dispersions of fumed silica without a stabilizer, having a fumed silica concentration greater than about 30% by weight, the aqueous colloidal dispersions produced are unstable and quickly gel. For example, U.S. Pat. No. 4,042,361 to Bihuniak, et al., hereinafter "Bihuniak", discloses an unstable aqueous colloidal dispersion of fumed silica without an alkali or stabilizer, having a fumed silica concentration up to about 45%, by weight. The stability of this colloidal dispersion, as disclosed in Bihuniak, can be measured in minutes, making the dispersion untransportable and unpractical for most purposes. Even Bihuniak, for the purposes of his invention, teaches the use of an aqueous colloidal dispersion of fumed silica having up to only about 30% by weight.

SUMMARY OF THE INVENTION

The present invention provides a solution to these and other problems by providing a stable, non-dilatant, low viscosity, filterable, aqueous colloidal dispersion of fumed silica, without an alkali or stablilizer, having a fumed silica concentration of at least about 35% by weight.

Another aspect of the present invention is a process for producing a non-stabilizer containing aqueous colloidal dispersion of fumed silica by admixing fumed silica with water in a mixer in an amount such that the fumed silica concentration by weight exceeds the amount of fumed silica desired in the final dispersion and then diluting the mixture with an additional amount of water such that the resulting aqueous colloidal dispersion contains the desired concentration of fumed silica. The mixture may optionally be filtered to remove grit and agglomerates.

The process of the present invention may be used with fumed silica having any surface area in order to produce aqueous colloidal dispersions of fumed silica. In order to produce an aqueous colloidal dispersions of fumed silica having a fumed silica concentration of at least 35% by weight according to the present invention, however, preferably a fumed silica with a surface area below about 75 square meters per gram (sq.m/g), more preferably between about 10 sq.m/g and about 75 sq.m/g, most preferably between about 35 sq.m/g and about 60 sq.m./g, is utilized.

An advantage of the present process is that the aqueous colloidal dispersions of fumed silica are stable and non-dilatant, and have low viscosities. For the purposes of the present invention "stable" means that the dispersion will not gel for a period of a least 2.0 hours. Typically, the aqueous colloidal dispersions of fumed silica produced according to the process of the present invention are stable for a period of at least a day, preferably several days, and more preferably several weeks to months. As previously explained, for the purposes of the present invention "non-dilatant" refers to the ability of a dispersion to pass through a 1000 micron or smaller pore size filter without gelling. Typically the aqueous colloidal dispersions of fumed silica, produced according to the process of the present invention, will pass through having a 250 micron or smaller pore size filter, preferably through a 25 micron or smaller pore size filter, and more preferably through a 10 micron or smaller pore size filter. Typically the "low viscosity" of the aqeuous colloidal dispersions of fumed silica, produced according to the process of the present invention, will be below about 1000 centipoise, preferably below about 250 centipoise.

With particular respect to the aqueous colloidal dispersions of fumed silica, having fumed silica concentrations of at least about 35%, by weight, another advantage of the present process is that these dispersions are stable for a period of days to weeks, non-dilatant and have low viscosities. The non-dilatancy and low viscosity permit the aqueous colloidal dispersions of fumed silica, having fumed silica concentrations of at least about 35%, by weight, to pass through a filter.

A further advantage of the present process is that after the aqueous colloidal dispersion of fumed silica gels, typically after a period of weeks, it can be re-liquefied for use by shaking or mixing.

Additional advantages of the present invention will become apparent from the following more detailed description of the invention.

DETAILED DESCRIPTION OF THE INVENTION

According to the present invention a mixer is charged, up to about 50% by volume, with a quantity of water, preferably water which has been de-ionized. Preferably the mixer utilized is a high shear mixer, capable of forming the dispersions, such as those generally known to the art. The amount of water initially charged into the mixer can obviously vary. However, as will become apparent from the following description, there must be room left in the mixer to add fumed silica and additional water. The initial quantity of water chosen is usually based on the amount of fumed silica to be added, and the desired final concentration of fumed silica in the aqueous colloidal dispersion of fumed silica. For example, if the desired final fumed silica concentration of the aqueous colloidal dispersion of fumed silica is about 50%, by weight, and 100 lbs. of fumed silica are to be added to the mixer, then the initial quantity of water is that quantity which will result in a greater than 50% by weight concentration of fumed silica in the mixer. Typically, in the process of the present invention the dispersion in the mixer, before dilution, will have a fumed silica concentration at least about 5% greater than the desired final concentration of fumed silica in the aqueous colloidal dispersion of fumed silica. Thereafter the colloidal dispersion in the mixer will be diluted by the addition of water to achieve the final concentration of the fumed silica in the aqueous colloidal dispersion of about 50% by weight.

After the mixer is charged with the appropriate amount of water, fumed silica is added to the water in the mixer. The fumed silica ma be added by mixing the fumed silica into the water while the mixer is operating, or by adding the fumed silica to the water and then operating the mixer. The fumed silica may also be added incrementally, in a series of steps, with the mixer operating between each step.

As previously discussed the process of the present invention may be utilized with fumed silicas having any surface areas. To produce aqueous colloidal dispersions of fumed silica having fumed silica concentrations at least about 35% by weight, preferably a fumed silica with a surface area less than about 75 sq.m/g is utilized. More preferably a fumed silica with a surface area between about 10 sq.m/g and about 75 sq.m/g is utilized, and most preferably a fumed silica with a surface area between about 35 sq.m/g and about 60 sq.m/g is utilized to form the aqeuous colloidal dispersions of fumed silica having fumed silica concentrations of at least about 35% by weight.

The immediate effect of the addition, or each addition, of fumed silica to the mixer will be to thicken the aqueous colloidal dispersion of fumed silica in the mixer. As the mixer continues to operate however, the aqueous colloidal dispersion of fumed silica in the mixer will thin.

After the concentration of fumed silica, by weight, in the aqueous colloidal dispersion of fumed silica in the mixer has been raised to a point above the desired final concentration of fumed silica, by weight, the mixer is allowed to operate until the dispersion in the mixer thins. As previously explained, typically in the process of the present invention, the dispersion in the mixer, before dilution, will have a fumed silica concentration at least about 5% greater that the desired final concentration of fumed silica in the aqueous colloidal dispersion of fumed silica. Then an additional amount of water is added to the mixer. Preferably this additional water has been deionized. The additional water is then mixed into the colloidal dispersion in the mixer by operating the mixer. The amount of water added is the amount which will lower the concentration of fumed silica, by weight, of the aqueous colloidal dispersion of fumed silica in the mixer to the desired final concentration. After the desired final concentration of fumed silica, by weight, has been achieved, the aqueous colloidal dispersion of fumed silica may be removed from the mixer, and stored or packaged for transport, in any of the manners generally known in the art. If desired, the aqueous colloidal dispersion of fumed silica may also be passed through a filter to remove grit and any agglomerated fumed silica particles.

The process of the present invention is well suited to produce aqueous colloidal dispersions of fumed silica without a stabilizer having any fumed silica concentration, by weight. However the process of the present invention is particularly useful for producing aqueous colloidal dispersions of fumed silica, without stabilizer, containing at least about 35% by weight fumed silica, which heretofore have not been produced in stable form. The aqueous colloidal dispersions of fumed silica of the present invention are stable for at least a period of days.

The effectiveness and advantages of the present invention will be further illustrated by the following Examples.

The following Examples illustrate the processes for producing aqueous colloidal dispersions of fumed silica having fumed silica concentrations of about 40%, 45%, 50%, and 65%, by weight respectively. Obviously, however, the amounts of fumed silica and water used in these examples can be varied to produce aqueous colloidal dispersions of fumed silica with different fumed silica concentrations.

EXAMPLE 1

The following Example illustrates the process for producing an aqueous colloidal dispersion of fumed silica, having a fumed silica concentration of about 40% by weight, using a 100 gallon capacity high shear mixer capable of forming the dispersions.

The high shear mixer is initially charged with 40 gallons of water. About 500 lbs of fumed silica, having a surface area of about 50 sq.m/g, is slowly added to the mixer, 100 lbs at a time, while the mixer is operating, to form an aqueous colloidal dispersion of fumed silica in the mixer having a fumed silica concentration of about 60% by weight. At this point, 50 additional gallons of water are slowly added to the mixer, while the mixer is operating, to dilute the aqueous colloidal dispersion of fumed silica in the mixer to one having the desired fumed silica concentration of about 40% by weight. This aqueous colloidal dispersion of fumed silica may optionally be filtered to remove any grit or agglomerated particles. Filtering the colloidal dispersion will change the fumed silica concentration less than about 0.5% by weight. The filtered or unfiltered aqueous colloidal dispersion of fumed silica, without a stabilizer is stable, non-dilatant and may be stored, and/or packaged for transport, in any of the manners generally known in the art. This aqueous colloidal dispersion of fumed silica, having a fumed silica concentration of about 40% by weight, is stable for a period of several days to weeks.

EXAMPLE 2

The following Example illustrates the process for producing an aqueous colloidal dispersion of fumed silica, having a fumed silica concentration of about 45% by weight, using a 100 gallon capacity high shear mixer capable of forming the dispersions.

The high shear mixer is initially charged with 40 gallons of water. About 500 lbs of fumed silica, having a surface area of about 50 sq.m/g, is slowly added to the mixer, 100 lbs at a time, while the mixer is operating, to form an aqueous colloidal dispersion of fumed silica in the mixer having a fumed silica concentration of about 60% by weight. At this point, 33 additional gallons of water are slowly added to the mixer, while the mixer is operating, to dilute the aqueous colloidal dispersion of fumed silica in the mixer to one having the desired fumed silica concentration of about 45% by weight. This aqueous colloidal dispersion of fumed silica may optionally be filtered to remove any grit or agglomerated particles. Filtering the colloidal dispersion will change the fumed silica concentration less than about 0.5% by weight. The filtered or unfiltered aqueous colloidal dispersion of fumed silica, without a stabilizer is stable, non-dilatant and may be stored, and/or packaged for transport, in any of the manners generally known in the art. This aqueous colloidal dispersion of fumed silica, having a fumed silica concentration of about 45% by weight, is stable for a period of several days to weeks.

EXAMPLE 3

The following Example illustrates the process for producing an aqueous colloidal dispersion of fumed silica, having a fumed silica concentration of about 50% by weight using a 100 gallon capacity high shear mixer capable of forming the dispersions.

The high shear mixer is initially charged with 32 gallons of water. About 500 lbs of fumed silica, having a surface area of about 50 sq.m/g, is slowly added to the mixer, 100 lbs at a time, while the mixer is operating, to form an aqueous colloidal dispersion of fumed silica, in the mixer, having a fumed silica concentration of about 65% by weight. At this point, 28 additional gallons of water are slowly added to the mixer, while the mixer is operating, to dilute the aqueous colloidal dispersion of fumed silica in the mixer to one having the desired fumed silica concentration of about 50% by weight. This aqueous colloidal dispersion of fumed silica may optionally be filtered to remove any grit or agglomerated particles. Filtering the colloidal dispersion will change the fumed silica concentration less than about 0.5% by weight. The filtered or unfiltered aqueous colloidal dispersion of fumed silica, without a stabilizer is stable, non-dilatant and may be stored, and/or packaged for transport, in any of the manners generally known in the art. This aqueous colloidal dispersions of fumed silica, having a fumed silica concentration of about 50% by weight, is stable for a period of at least one day.

EXAMPLE 4

Following the same process as described in Examples 1, 2 and 3, an aqueous colloidal dispersion of fumed silica having a fumed silica concentration of about 65% by weight, can be produced by initially charging the mixer with 26 gallons of water, adding about 500 lbs. of fumed silica, having a surface area of about 50 sq.m/g to the mixer, to form a dispersion having a fumed silica concentration of about 70%, by weight, and then diluting with 6 additional gallons of water. The resulting aqueous colloidal dispersion of fumed silica, having a fumed silica concentration of about 65% by weight, would be stable and non-dilatant.

Similar results may be obtained by varying the amount the mixer is initially charged with water, the amount of fumed silica, by weight, added to the mixer, and the amount of additional water added to dilute the dispersion in the mixer to achieve stable, non-dilatant aqueous colloidal dispersions of fumed silica having fumed silica concentration of about 35%, 55%, and 60% by weight.

Numerous modifications and variations may obviously be made in the above described Examples without departing from the present invention. Accordingly, it should be clearly understood that the forms of the present invention herein described are illustrative only and are not intended to limit the scope of the invention. The present invention includes all modifications falling within the scope of the following claims.

We claim:

1. An aqueous colloidal dispersion consisting of: at least about 35%, by weight fumed silica dispersed in water, wherein the dispersion by high shear mixing will not gel for a period of at least 2 hours, has a viscosity of below about 1000 centipoise, and is non-dilatant.

2. The dispersion of claim 1 wherein the fumed silica is present in an amount of between about 35% and 65% by weight.

3. The dispersion of claim 1 wherein the fumed silica is present in an amount of about 35% by weight.

4. The dispersion of claim 1 wherein the fumed silica is present in an amount of about 40% by weight.

5. The dispersion of claim 1 wherein the fumed silica is present in an amount of about 45% by weight.

6. The dispersion of claim 1 wherein the fumed silica is present in an amount of about 50% by weight.

7. The dispersion of claim 1 wherein the fumed silica has a surface area of less than about 75 square meters per gram.

8. The dispersion of claim 1 wherein the fumed silica has a surface area between about 10 and about 75 square meters per gram.

9. The dispersion of claim 1 wherein the fumed silica has a surface area between about 35 and about 60 square meters per gram.

10. The dispersion of claim 1 wherein the fumed silica has a surface area of about 50 square meters per gram.

11. The dispersion of claim 1 having a viscosity below about 250 centipoise.

12. A process for producing an aqueous colloidal dispersion of fumed silica consisting of: adding a fumed silica to water to form a first dispersion by high shear mixing having a fumed silica to water concentration, by weight exceeding that which is desired in a final dispersion, and then diluting the first dispersion with water to produce the final dispersion having a fumed silica concentration by weight of at least about 35%, wherein the final dispersion is stable for a period of at least two hours, and has a viscosity of below about 1000 centipoise, and is non-dilatant.

13. The process of claim 12 wherein the concentration of fumed silica in the final dispersion is about 40% by weight.

14. The process of claim 12 wherein the concentration of fumed silica in the final dispersion is about 45% by weight.

15. The process of claim 12 wherein the fumed silica has a surface area between about 10 and about 75 square meters per gram.

16. The process of claim 12 wherein the fumed silica has a surface are between about 35 and about 60 square meters per gram.

17. The process of claim 12 wherein the fumed silica has a surface area of about 50 square meters per gram.

18. The process of claim 12 wherein the concentration of fumed silica in the first dispersion, by weight, exceeds the concentration of fumed silica in the final dispersion, by weight, by at least 5%.

19. The process of claim 12 wherein the final dispersion has a viscosity below about 250 centipoise.

* * * * *

UNITED STATES PATENT AND TRADEMARK OFFICE
CERTIFICATE OF CORRECTION

PATENT NO. : 5,116,535

DATED : May 26, 1992

INVENTOR(S) : Hector Cochrane

It is certified that error appears in the above-identified patent and that said Letters Patent is hereby corrected as shown below:

Column 4, Line 34 " Silica ma be added "
   Should read: -- silica may be added --

Column 4, Line 67 " that "
   Should read: -- than --

Column 8, Line 32 " surface are "
   Should read: -- surface area --

Signed and Sealed this

Twelfth Day of October, 1993

*Attest:*

BRUCE LEHMAN

*Attesting Officer*     *Commissioner of Patents and Trademarks*